P. MUELLER.
FLOAT VALVE.
APPLICATION FILED MAR. 28, 1911.
1,078,943.
Patented Nov. 18, 1913.
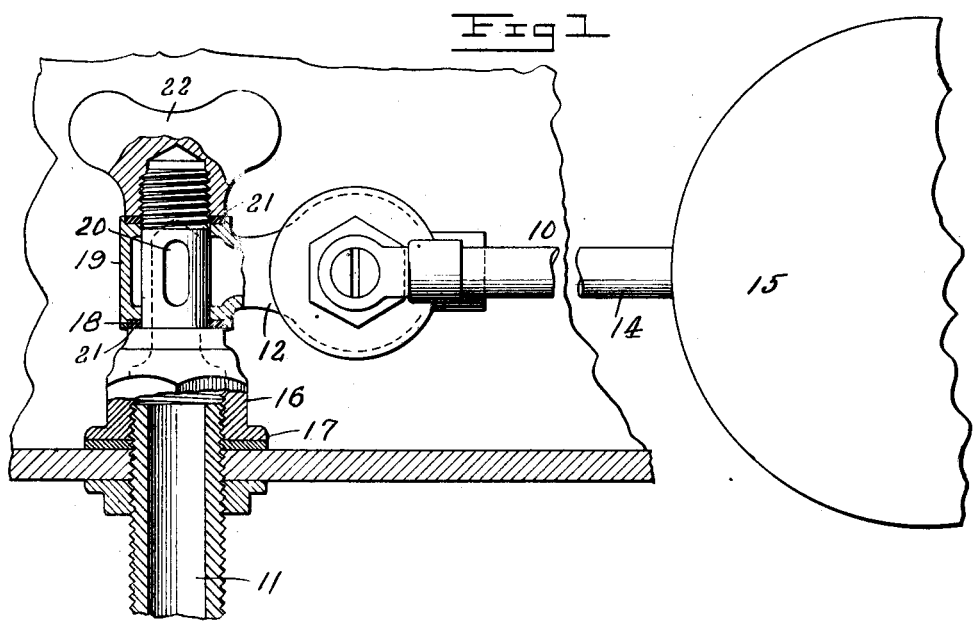
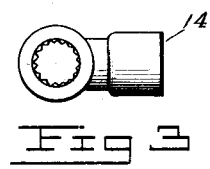
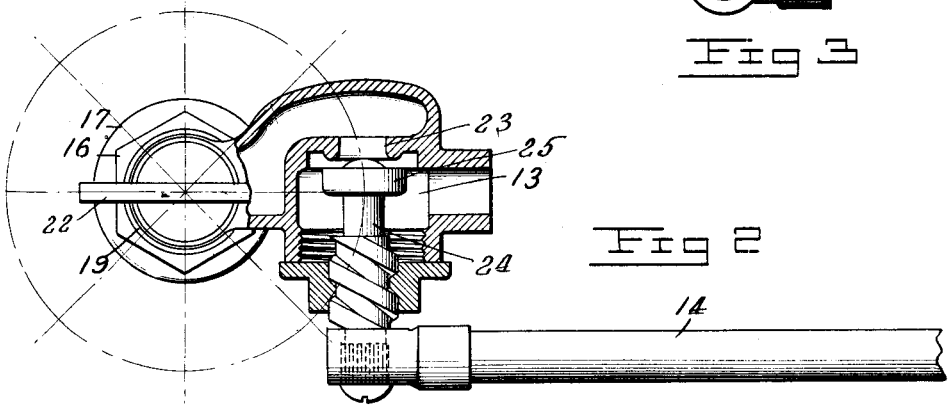
Inventor
Philip Mueller
Witnesses
By
Attorneys

UNITED STATES PATENT OFFICE.

PHILIP MUELLER, OF DECATUR, ILLINOIS, ASSIGNOR TO H. MUELLER MFG. CO., OF DECATUR, ILLINOIS, A CORPORATION OF ILLINOIS.

FLOAT-VALVE.

1,078,943. Specification of Letters Patent. Patented Nov. 18, 1913.

Application filed March 28, 1911. Serial No. 617,511.

*To all whom it may concern:*

Be it known that I, PHILIP MUELLER, a citizen of the United States, residing at Decatur, in the county of Macon and State of Illinois, have invented new and useful Improvements in Float-Valves, of which the following is a specification.

My invention consists of a float valve of the ball cock type for use in connection with tanks generally.

The object of my invention is to provide a valve which is adapted for ready and convenient use with flush tanks, such as are commonly used, and in which the presence of flush device mechanisms makes it desirable that the float valve used be capable of adjustment to a position in which the other devices present will not interfere with its operation, and in which it may have free play to operate to open and close the valve. While having the special purpose named, however, my invention is capable of application to the float and regulating valves of tanks generally.

In the attainment of the prime object of my invention I have mounted the valve in a lateral branch connection with the riser or supply pipe which supplies water to the tank, and have given the lateral branch connection a swiveled adjustable connection with the riser, so that it and the valve are adjustable with respect to the riser. Thus the ball or other float, and lever of the valve, as well as the valve, may be moved to any desired position and held there.

I have shown one embodiment of my invention applied to a small flush tank in the drawings.

Of the drawings Figure 1 is a sectional elevation of the tank showing the float valve of my invention applied, with certain parts of the lateral branch connection broken away in order to show its interior construction; Fig. 2 is a plan view with certain parts of the lateral branch connection in section in order to show the valve construction, and Fig. 3 is a side view of the valve end of the float lever showing a detail.

10 designates generally the tank, only the immediate walls of which are shown, 11 the supply pipe or riser which supplies water to the tank, and which pipe passes through the bottom of this tank and has a screw threaded end. The invention, however, is not limited to the application thereof to a vertical riser which passes through the bottom of the tank.

12 is the lateral branch connection carrying the float valve which is designated 13, 14 is the float lever and 15 a ball connected therewith.

As is usual in float valves, and as clearly shown in Fig. 2 the rise of the float is adapted to close the valve, while a lowering of the float, due to a lowering of the level of water in the tank, is adapted to open the valve.

The lateral branch connection 12 is swiveled on the upper end of a stud 16 screw threaded to the riser 11. Thus the lateral branch 12 has a swiveled connection with, or with relation to, the riser or supply pipe. The lower end or cap end of this stud, is provided with an extended base 17 adapted to rest against the bottom of the tank or against the packing, as shown, in order to make a water tight joint, and above the portion 17 is formed hexagonal in shape to accommodate a wrench. Above the cap portion the stud is reduced in cross section to form a shoulder 18 and the journal portion of the stud 19. This cap stud is centrally cored out, to communicate with the riser and provided with lateral openings 20. The lateral branch connection 12 is journaled on the upper end 19 of the stud as shown, and communicates with the riser through the lateral openings in the stud. Suitable packings 21 are provided on one side between the lateral connection 12 and the shoulder 18, and on the other side between the branch connection 12 and a wing nut 22 screw threaded to the upper end of the stud to hold the branch connection in any adjusted position, and to make a water tight joint. The opposite sides of the lateral branch connection are socketed as shown to better accommodate and hold the packings 21. The valve in the lateral branch comprises the seat 23, the stem 24 having a coarse screw threaded connection with the branch and the valve disk 25 on the stem. Constructed in this manner, the valve of my invention may be laterally adjusted around the riser as an axis to any position on the dotted line circle shown in Fig. 2. In any of these positions, the float acts to operate the valve in the usual manner. Moreover the valve may be repaired when necessary by simply removing the lateral branch which carries it and without breaking the supply pipe connection.

As shown in Figs. 2 and 3 the float itself is connected to the stem of the valve by intermeshing serrations or corrugations on the stem and the float respectively, so that the float may be taken off and replaced in any position whatsoever with respect to the stem, thus giving the float an angular adjustment with respect to the valve, and enabling one to regulate the level of water within the tank.

The form of the end 16 of the stud connecting with the riser 11 may be anything suited to the purpose.

What I claim is:—

The combination with a tank, of a supply pipe therefor, the end of which projects through the bottom thereof, a straight hollow stud located within the tank and detachably connected to the end of the supply pipe, a valve casing detachably connected to and swiveled upon said stud and in continuous communication with the supply pipe through said stud, means for holding said valve casing in place upon the stud, a valve carried by said swiveled casing and operating in a line substantially at right angles to the axis of said stud, and a float connected to the stem of said valve, substantially as described.

In testimony whereof I have hereunto set my hand in presence of two subscribing witnesses.

PHILIP MUELLER.

Witnesses:
LEONARD F. MCKIBBEN,
WILLIAM R. BIDDLE.